United States Patent
Waldburger

(10) Patent No.: US 10,018,231 B2
(45) Date of Patent: Jul. 10, 2018

(54) SYNCHRONIZING CLUTCH

(71) Applicant: Renk-Maag GmbH, Winterthur (CH)

(72) Inventor: Michael Waldburger, Nurensdorf (CH)

(73) Assignee: RENK-MAAG GMBH, Winterthur (CH)

( * ) Notice: Subject to any disclaimer, the term of this patent is extended or adjusted under 35 U.S.C. 154(b) by 225 days.

(21) Appl. No.: 14/905,372

(22) PCT Filed: Jul. 19, 2013

(86) PCT No.: PCT/EP2013/065316
§ 371 (c)(1),
(2) Date: Jan. 15, 2016

(87) PCT Pub. No.: WO2015/007341
PCT Pub. Date: Jan. 22, 2015

(65) Prior Publication Data
US 2016/0160937 A1 Jun. 9, 2016

(51) Int. Cl.
*F16D 23/10* (2006.01)
*F16D 43/04* (2006.01)

(52) U.S. Cl.
CPC ............. *F16D 23/10* (2013.01); *F16D 43/04* (2013.01)

(58) Field of Classification Search
CPC .................................. F16D 23/10; F16D 43/04
See application file for complete search history.

(56) References Cited

U.S. PATENT DOCUMENTS

| | | | | |
|---|---|---|---|---|
| 1,862,188 A | * | 6/1932 | Legge | ..................... F16D 23/10 192/41 R |
| 2,120,092 A | | 6/1938 | Doran | |
| 2,433,428 A | * | 12/1947 | Carnagua | ................ F16D 23/10 192/114 R |
| 2,776,571 A | * | 1/1957 | Simone | ................. F02N 15/027 192/35 |
| 3,563,354 A | | 2/1971 | Sigg | |
| 4,053,038 A | | 10/1977 | Herrick | |

FOREIGN PATENT DOCUMENTS

CH            499 735        11/1970

OTHER PUBLICATIONS

International Search Report for PCT/EP2013/065316 dated Mar. 27, 2014.
Written Opinion for PCT/EP2013/065316 dated Mar. 27, 2014.

* cited by examiner

Primary Examiner — Stacey Fluhart
(74) Attorney, Agent, or Firm — Pearne & Gordon LLP

(57) ABSTRACT

A synchronizing clutch includes a synchronizing mechanism that can be displaced longitudinally in an axial direction along the longitudinal axis of the synchronizing clutch between a first and a second hub. The mechanism has a synchromesh sleeve with a first ratchet carrier and the synchromesh sleeve has a ratchet located on said carrier. In addition, the ratchet carrier is connected to the first hub in a longitudinally displaceable manner by means of helical toothing. At least one compression spring element is operatively arranged between the ratchet carrier and the first hub and runs parallel to the longitudinal axis of the synchronizing clutch.

6 Claims, 2 Drawing Sheets

SYNCHRONIZING CLUTCH

The present invention relates to a synchronizing clutch according to the preamble of claim 1.

A synchronizing clutch is used between a driving machine and a driven machine. In this case, the synchronizing clutch automatically engages when the driving machine overtakes the driven machine in terms of rotational speed, i.e. when it exhibits a higher number of revolutions. Accordingly, the clutch also independently disengages again when the rotational speed of the driving machine drops proportionally to the driven machine. Such a synchronizing clutch is thus configured as a shifting clutch which is provided with an automatic resp. independent synchronizing mechanism. This synchronizing mechanism itself does not participate in the transmission of forces.

Such clutches are used for example in ship propulsion, where they are used in the force flux between a gas turbine and a driving unit of the ship propeller connected for example with a diesel generator set.

Such clutches are also used in power stations, for example between a generator and a turbine, for example a gas or steam turbine.

Synchronizing clutches of the type described are known for example from CH499735, wherein the synchronizing mechanism is configured with automatically engaging mechanical catch elements. The synchronizing mechanism in this case is formed as a coupling spider, arranged as axially movable between two coupling hubs with an axially fixed synchronizing sleeve therein but also in turn rotatably mounted. Here, the coupling spider is always engaged with the first clutch hub, while the synchronizing sleeve is connected to the second clutch hub via a helical gear or steep gear toothing. A connection between the clutch star and the synchronizer sleeve is effected by means of catches, arranged between these two elements, which interlock with the corresponding gearing of the synchronizer sleeve or coupling spider, and thus provide an interlocking connection acting in one direction of rotation between the synchronizer sleeve and coupling spider. The coupling spider is then pushed into the second clutch hub a via second helical gear or steep gear toothing against a stop and thereby the clutch is activated, wherein the slope of this second helical gear respectively steep gear toothing is greater than the first helical gear or steep toothing of the synchronizer sleeve. Thus, the catches are released and the flow of force of the engaged clutch occurs solely via the coupling spider, which is now directly engaged with the first and second clutch hub. As soon as a negative torque acts on the clutch, the synchronizer sleeve moves back via the second helical gear respectively steep gear toothing into the disengaged position and thus disengages from the interlocking with the second clutch hub.

The advantage of such a clutch can be seen in the fact that it achieves a robust and reliable engagement and disengagement over a large operating range without additional control or mobility aids.

One problem with this arrangement, however, is that the negative torque has to apply enough force to axially move the synchronizer sleeve along the helical gear or steep gear toothing. If the differential speeds between input and output shafts of the synchronizing clutch are only very small, this force may be too small, especially at low rotational speeds. This can cause the clutch not to automatically disengage completely because the necessary negative torque or braking torque necessary for this is too low.

It is known to support this axial movement hydraulically by having the synchronizer sleeve formed as a piston that can be moved to the disengaged position for example with oil via a pressure connection. In this way the disengagement can be adjustably operated and does not depend on the rotational speed or the braking torque. However, this entails having a more complex construction and a supply of pressure oil, which at low rotational speeds can not be produced by the clutch itself but must come from an external pressure supply connection.

The aim of the present invention was to find a synchronizing clutch of the type mentioned, which ensures an independent, reliable disengagement of the clutch even at very low rotational speeds also with small braking torques.

This aim is solved according to the invention by means of a synchronizing clutch having the characteristics of claim 1. Further inventive embodiments result from the characteristics of claims 2 to 6.

In a synchronizing clutch comprising a synchronizing mechanism that can be displaced longitudinally in an axial direction along the longitudinal axis of the synchronizing clutch arranged between a first and a second hub, with a synchromesh sleeve, wherein the synchromesh sleeve has a ratchet carrier and a ratchet located thereon, and wherein the ratchet carrier is connected to the first hub by means of a helical gear toothing, according to the invention at least one compression spring element is arranged between the ratchet carrier and the first hub, operating in parallel to the longitudinal axis of the synchronizing clutch. The compression spring element supports the axial longitudinal displacement of the ratchet carrier and thus of the whole synchronizing mechanism from the engaged to the disengaged position, even if only a little braking torque is available via the second hub. The spring force is selected such that when a positive driving torque via the second hub in the clutch is present, both the engaging movement of the synchronizing mechanism as well as the engaged operation is not affected, but an independent disengagement occurs when there is no driving torque, even if no or only a small braking torque is available. The use of the pressure spring element makes this effect independent of the rotational speed and can guarantee a reliable disengagement even at very low rotational speeds. Furthermore, only little space is needed for the construction, especially in the radial direction, which is an advantage for the usually very limited space for such couplings.

In one embodiment of the inventive synchronizing clutch, several compression spring elements are arranged along at least one radial circle on the ratchet carrier, preferably regularly spaced from each other. Preferably at least 8 compression spring elements are arranged, in very large clutches at least 20 compression spring elements may also be arranged. In the arrangement along a single radial circle around the longitudinal axis of the synchronizing clutch, the space required for the compression spring elements in a radial direction is minimized. If more space is available in large synchronizing couplings, the compression spring elements can also be arranged on two or more radial circles, coaxially placed to each other, and for example can be arranged along the circumference at a regular distance to one another, i.e. each with alternating radial distances from the longitudinal axis of the synchronizing clutch.

In a further embodiment of the inventive synchronizing clutch, the compression spring element is formed with at least two spring coils moving in opposite directions to each other. This arrangement allows a space-saving and highly accurate design of the spring action. In addition, at least part of the spring effect is maintained even in the event of a single spring failure.

In a further embodiment of the inventive synchronizing clutch, the spring coils are arranged between two sleeves, at least one of which is displaceably arranged along a guide rod that is arranged in coaxial manner to the spring coils. By means of the sleeves, the respective ends of the spring coils can be optimally received and optimal force application and transmission can be ensured. The guide rod prevents a spring coil from bulging transversely to the pressure direction and thus the spring effect from being reduced or completely stopped. The production, storage and installation of the compression spring elements are also simplified in this way.

In a further embodiment of the inventive synchronizing clutch, the ends of the guide rod are each held in a flange of the first hub and it is the guide rod that is guided through a slot hole in a flange of the ratchet carrier, which is designed to be arranged between the flanges of the first hub. Thus with minimal space requirements, a reliable force fit is formed between the first hub and the ratchet carrier and thus the synchronizing mechanism. The longitudinal displacement of the ratchet carrier is not impeded by the slot hole that according to the relative rotational movement between the ratchet carrier and the first hub, which originates from the connection via a helical gear toothing between these two elements, is formed as an arc plane, and the compression spring element can be arranged in a space-saving manner, very close to the hub respectively the ratchet carrier, so that no additional space for the arrangement of the compression spring element is radially needed.

In a further embodiment of the inventive synchronizing clutch, the compression spring element is formed with pressure springs with a low spring constant. This means that a spring constant is set respectively selected with a flat evolution of the force curve in relation to the pitch of the spring. A course as linear and shallow as possible is aimed for, so that the spring force in the tensioned state is only slightly higher than in the prestressed state, and so that consequently the return behavior of the clutch can be adjusted well.

Embodiments of the present invention are explained in more detail below with reference to figures, in which.

Figure 1:
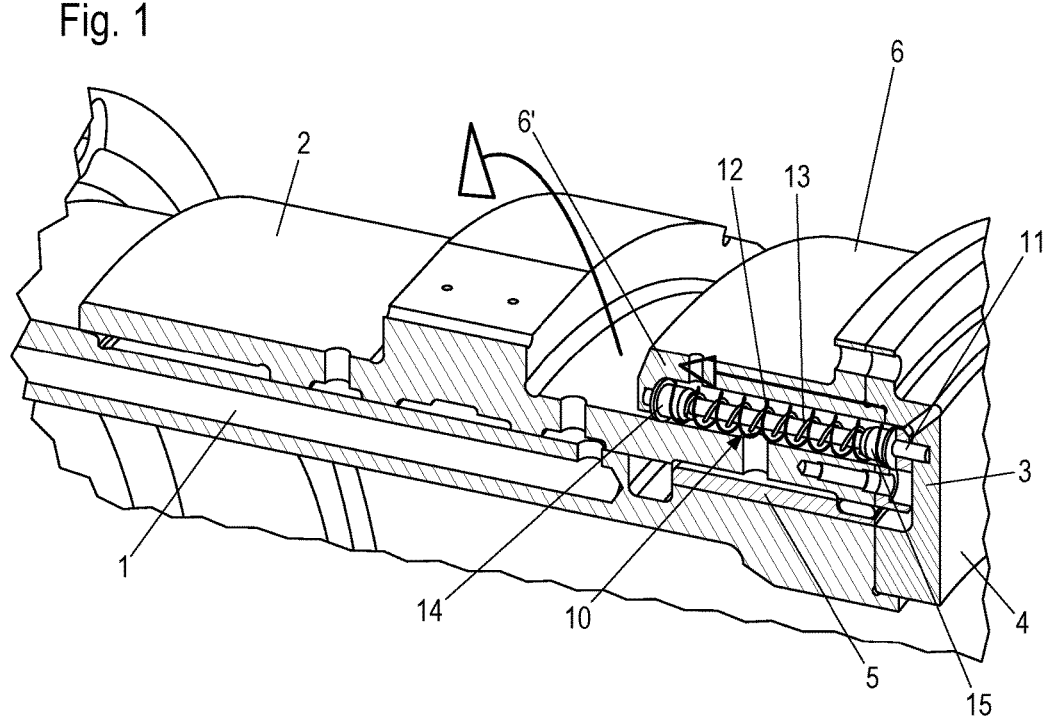
FIG. 1 shows schematically the view of an inventive synchronizing clutch in a partial cross section through the region of the synchronizing mechanism.

FIG. 1 shows the schematic view of a cross section through an inventive synchronizing clutch in the area of the synchronizing mechanism. For the sake of simplicity, only the section with the inventive compression spring element is shown, the remaining elements of the synchronizing coupling are executed in the manner of a ratchet clutch known to those skilled in the art and do not need to be explained in more detail. A ratchet wheel 2, moveably arranged on a first hub 1 along the longitudinal axis of the synchronizing clutch, is shown in its disengaged position. In FIG. 1, the ratchet wheel 2 is set at a stop against the shoulder 3 of a closing flange 4 of the hub 1.

The ratchet wheel 2 is connected in interlocking fashion via a helical gear 5 with the hub 1. When moving the ratchet wheel 2 in the direction of the engaged position (in FIG. 1 to the left), the ratchet wheel 2 is then slightly twisted radially relative to the hub 1, according to the slope of the helical gear.

A retaining ring 6 is arranged at the closing flange 4 in the direction of the ratchet wheel 2. A compression spring element 10 is arranged between the inside of the stop wall of the closing flange 4 and the inwardly directed edge 6' of the retaining ring 6.

The compression spring element 10 is formed by a guide rod 11 whose ends are each mounted in the edge 6' of the retaining ring 6 and the closing flange 4, as well as two spring coils 12, 13, whose ends are supported in sleeves 14, 15. The spring coils 12, 13 are preferably arranged enmeshed in opposite directions. The right sleeve 15 is designed in a movable manner along the guide rod 11 and is supported against a flange 2' of the ratchet wheel 2. Thus, a spring force is exerted on the ratchet wheel 2 via the compression spring element 10, which moves the ratchet wheel 2 into the position represented in FIG. 1, if no other forces are exerted on the ratchet wheel 2.

If now a positive torque acts on the ratchet wheel 2 in the direction of the arrow M via the catches (not shown in the figure), the ratchet wheel 2 is moved to the left into the engaged position, in a manner known to those skilled in the art, due to the correspondingly designed helical gear toothing 5, and thus the compression spring element 10 is compressed. The additional amount of power needed for this is very small and can be obtained by the conventional operation of the ratchet clutch without any problems. In the engaged mode when the force fit between the first and second hub (not shown in FIG. 1) is made, and the catches no longer engage positively, the positive torque then applied to the clutch is sufficient to hold this position against the force of the compression spring element 10. Only when this positive torque ceases does the compression spring element 10 support the disengagement of the clutch, as shown above, i.e. the displacement of the ratchet wheel and thus of the whole synchronizing mechanism, into the disengaged position.

Figure 2:
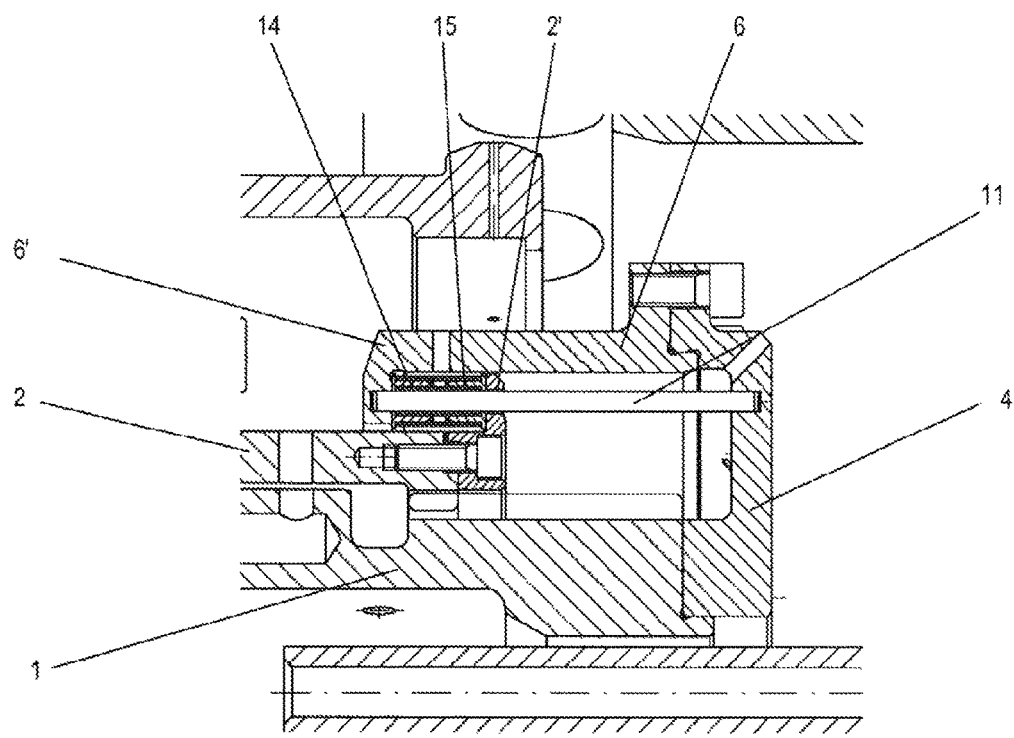
FIG. 2 shows a longitudinal cross section through an inventive synchronizing clutch in the area of a synchronizing mechanism in the engaged position.

FIG. 2 shows in greater detail the longitudinal section through such an inventive synchronizing clutch in the area of the synchronizing mechanism in the engaged position. Here the bearing of the ends of the guide rod 11 in the edge 6' of the retaining ring 6 and closing flange 4 can be clearly seen. Both the closing flange 4 and the retaining ring 6 are advantageously removably connected to the first hub 1, so that these parts can be easily assembled and disassembled, and in particular a good access to the compression spring elements 10 remains ensured.

Also it can easily be seen how the right sleeve 15 is braced against the flange 2' of the ratchet wheel 2. The sleeves 14 and 15 are here designed as hollow sleeves with unilaterally disposed collar, against which the ends of the spring coils are supported (not shown in the FIG. 2 for the sake of clarity). Of course, other configurations for the accommodation and support are also conceivable.

Figure 3:
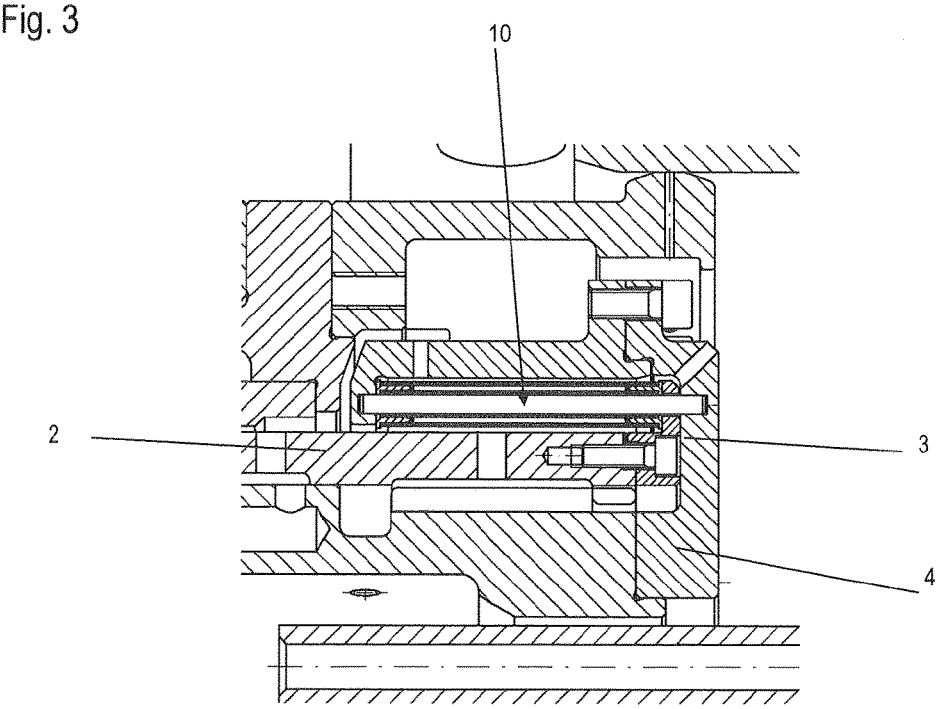
FIG. 3 shows a longitudinal section according to FIG. 2 in the disengaged position.

FIG. 3 illustrates the longitudinal section according to FIG. 2 of the synchronizing mechanism in disengaged position, i.e. the ratchet wheel 2 is in the disengaged position abutting the stop of the closing flange 4. In this case, the compression spring element 10 is disengaged in its extended position. The low radial space requirement due to the arrangement of the compression spring elements 10 immediately in the vicinity of the exterior of the ratchet wheel 2 is also clearly visible.

The invention claimed is:

1. A synchronizing clutch with a synchronizing mechanism that can be displaced longitudinally in an axial direction along the longitudinal axis of the synchronizing clutch between a first and a second hub, with a synchromesh sleeve, wherein the synchromesh sleeve has a ratchet carrier, and wherein the ratchet carrier is connected to the first hub in a longitudinally displaceable manner by means of a helical gear toothing, wherein at least one compression spring element is arranged between the ratchet carrier and the first hub, operating in parallel to the longitudinal axis of the synchronizing clutch, and wherein the compression spring element is formed with at least two spring coils moving in opposite directions to one another.

2. The synchronizing clutch according to claim 1, wherein several compression spring elements are arranged along at least one radial circle on the ratchet carrier.

3. The synchronizing clutch according to claim 2, wherein the several compression spring elements are regularly spaced from one another.

4. The synchronizing clutch according to claim 1, wherein the spring coils are arranged between two support sleeves, wherein at least one of which is displaceably arranged along a guide rod, arranged coaxially to the spring coils.

5. The synchronizing clutch according to claim 4, wherein the ends of the guide rod are each held in a flange of the first hub and the guide rod is guided through a slot hole in a flange of the ratchet carrier which is designed to be arranged between the flanges of the first hub.

6. The synchronizing clutch according to claim 1, wherein the compression spring element is designed with pressure springs with a spring constant that allows for a linear force curve.

* * * * *